United States Patent

Inoue et al.

[11] Patent Number: 5,823,089
[45] Date of Patent: Oct. 20, 1998

[54] BOOSTER

[75] Inventors: Hidefumi Inoue; Masahiro Ikeda, both of Saitama-Ken, Japan

[73] Assignee: Jidosha Kiki Co., Ltd., Tokyo, Japan

[21] Appl. No.: 893,326

[22] Filed: Jul. 16, 1997

[30] Foreign Application Priority Data

Aug. 2, 1996 [JP] Japan .................................. 8-220648

[51] Int. Cl.⁶ ...................................................... F15B 9/10
[52] U.S. Cl. ........................................................ 91/369.2
[58] Field of Search .............................. 91/369.2, 369.3, 91/376 R

[56] References Cited

U.S. PATENT DOCUMENTS

| | | | |
|---|---|---|---|
| 3,548,595 | 12/1970 | Pech et al. | 91/369.3 |
| 4,664,016 | 5/1987 | Tobisawa et al. . | |
| 5,146,837 | 9/1992 | Inoue . | |
| 5,161,451 | 11/1992 | Fecher | 91/376 R |
| 5,699,716 | 12/1997 | Mortimer | 91/369.2 |

FOREIGN PATENT DOCUMENTS 8-85442  4/1996  Japan .

*Primary Examiner*—F. Daniel Lopez
*Attorney, Agent, or Firm*—Flynn, Thiel, Boutell & Tanis, P.C.

[57] ABSTRACT

An improvement of a booster as may be used in a brake of an automobile is provided. The booster is provided with pseudo-reaction imparting means (spring) which imparts a pseudo-reaction which depends on the travel of an input shaft to the input shaft. An arrangement is made in accordance with the invention such that when an input applied to the input shaft exceeds a given value, only the pseudo-reaction from the pseudo-reaction imparting means (spring) is transmitted to a driver. The arrangement enables an increased output to be reliably obtained, even by a powerless female driver, whenever a braking force of an increased magnitude is required as when using the booster as an emergency brake.

3 Claims, 3 Drawing Sheets

BOOSTER

FIELD OF THE INVENTION

The invention relates to a booster as may be used in a brake of an automobile, and more particularly, to a booster which is designed to reach a full load operating point rapidly whenever a force of depression exceeds a given value.

DESCRIPTION OF THE PRIOR ART

A brake booster is known in the art which comprises a valve body slidably disposed within a shell, a valve plunger slidably fitted into the valve body and coupled to an input shaft, an output shaft having its one end slidably mounted on the valve body, a reaction disc disposed between said one end of the output shaft and the valve plunger, a reaction transmitting member having a front end which is disposed in opposing relationship with the reaction disc and a r ear end which is slidably fitted in the valve plunger, and a spring charged to a preset load and disposed between the reaction transmitting member and the valve plunger for normally urging the reaction transmitting member toward the front side, an arrangement being such that a reaction from the output which is applied to the output shaft is transmitted to the input shaft through the reaction disc, the reaction transmitting member, the spring and the valve plunger (see Japanese Laid-Open Patent Application No.85,442/96).

In the booster mentioned above, a servo ratio can be changed under different conditions, namely, after the initiation of operation of the booster, as the reaction transmitting member abuts against the reaction disc as the input increases, but before the spring is compressed, in the process of the spring being compressed, and after the reaction transmitting member abuts against the valve plunger subsequent to a further compression of the spring.

Specifically, a conventional arrangement as mentioned above is designed such that a servo ratio becomes greater with a greater input than when the input is smaller. In this manner, a good brake feeling is assured under a small input while simultaneously assuring a sufficient output in need of an increased braking force as when it is operated as an emergency brake.

However, while the booster mentioned above is designed to provide a greater servo ratio in response to an increased input, it is necessary to increase the magnitude of the input as a matter of course in order to derive an output in an operating region of an increased servo ratio. For this reason, it happens that when a driver is a powerless woman, for example, a reduced force of depression (input) applied to a brake pedal fails to achieve an enough booster output to operate as an emergency brake.

SUMMARY OF THE INVENTION

In view of the foregoing, in a booster including a valve body slidably disposed within a shell, a valve plunger slidably fitted in the valve body and coupled to an input shaft, an output shaft having its one end slidably mounted on the valve body, a reaction disc disposed between said one end of the output shaft and the valve plunger, a reaction transmitting member having a front end which is disposed in opposing relationship with the reaction disc and having a rear end which is slidably fitted with the valve plunger, and a spring charged to a preset load and disposed between the reaction transmitting member and the valve plunger for normally urging the reaction transmitting member toward the front side, an arrangement being such that a reaction from the output which is applied to the output shaft is transmitted to the input shaft through the reaction disc, the reaction transmitting member, the spring and the valve plunger, in accordance with the invention, there is provided pseudo-reaction imparting means which imparts a pseudo-reaction, which depends on the travel of the input shaft, to the input shaft, and a stop is mounted on the valve body so that when an input applied to the input shaft exceeds a given value, the spring is compressed to cause the reaction transmitting member to abut against the stop, thus preventing a reaction from the output which is acting on the output shaft from being transmitted to the input shaft.

With this arrangement, after the initiation of operation of the booster in response to the depression of a brake pedal, when a force of depression (input) applied to a brake pedal is small, the spring cannot be compressed if the reaction disc abuts against the reaction transmitting member. In other words, the reaction transmitting member, the spring and the valve plunger function as if they are substantially integral, thus allowing an output of a given servo ratio to be obtained in the similar manner as in a conventional booster. Since the pseudo-reaction imparting means imparts a pseudo-reaction to the valve plunger as the brake pedal is depressed, this pseudo-reaction is combined with a reaction which is transmitted to the valve plunger through the reaction disc to provide a combined reaction, which is transmitted to a driver through the brake pedal.

By contrast, when the force of depression (input) applied to the brake pedal increases subsequent to the initiation of operation of the booster and exceeds a given value, the spring is compressed to allow part of reaction transmitting member to abut against the stop on the valve body, whereby a reaction from the output which is acting upon the output shaft is prevented from being transmitted to the input shaft. Accordingly, only the pseudo-reaction which is imparted by the pseudo-reaction imparting means is transmitted to the driver. This permits a reaction transmitted to the driver to be reduced extremely, allowing the force of depression (input) applied to the brake pedal to be increased to permit the booster to reach a full load operating point rapidly, enabling an increased output to be obtained. Accordingly, this arrangement enables an increased output to be obtained reliably by a powerless driver such as a woman in the event an increased magnitude of braking force is required as when the booster is used as an emergency brake.

Above an other objects, features and advantages of the invention will become apparent from the following description with reference to the attached drawings.

DETAILED DESCRIPTION OF THE EMBODIMENTS

Figure 1:
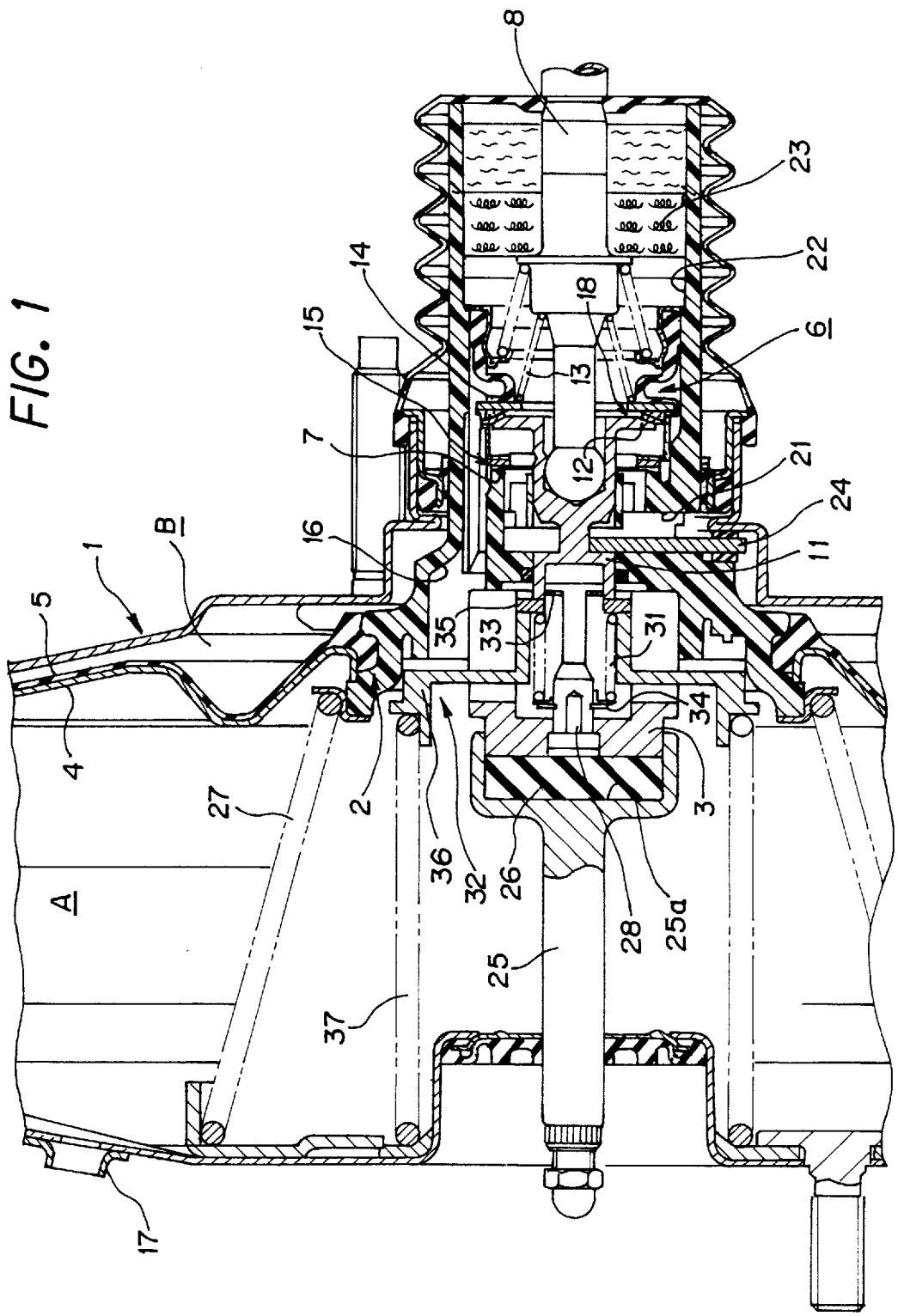
FIG. 1 is a cross section of a first embodiment of the invention.
Figure 2:
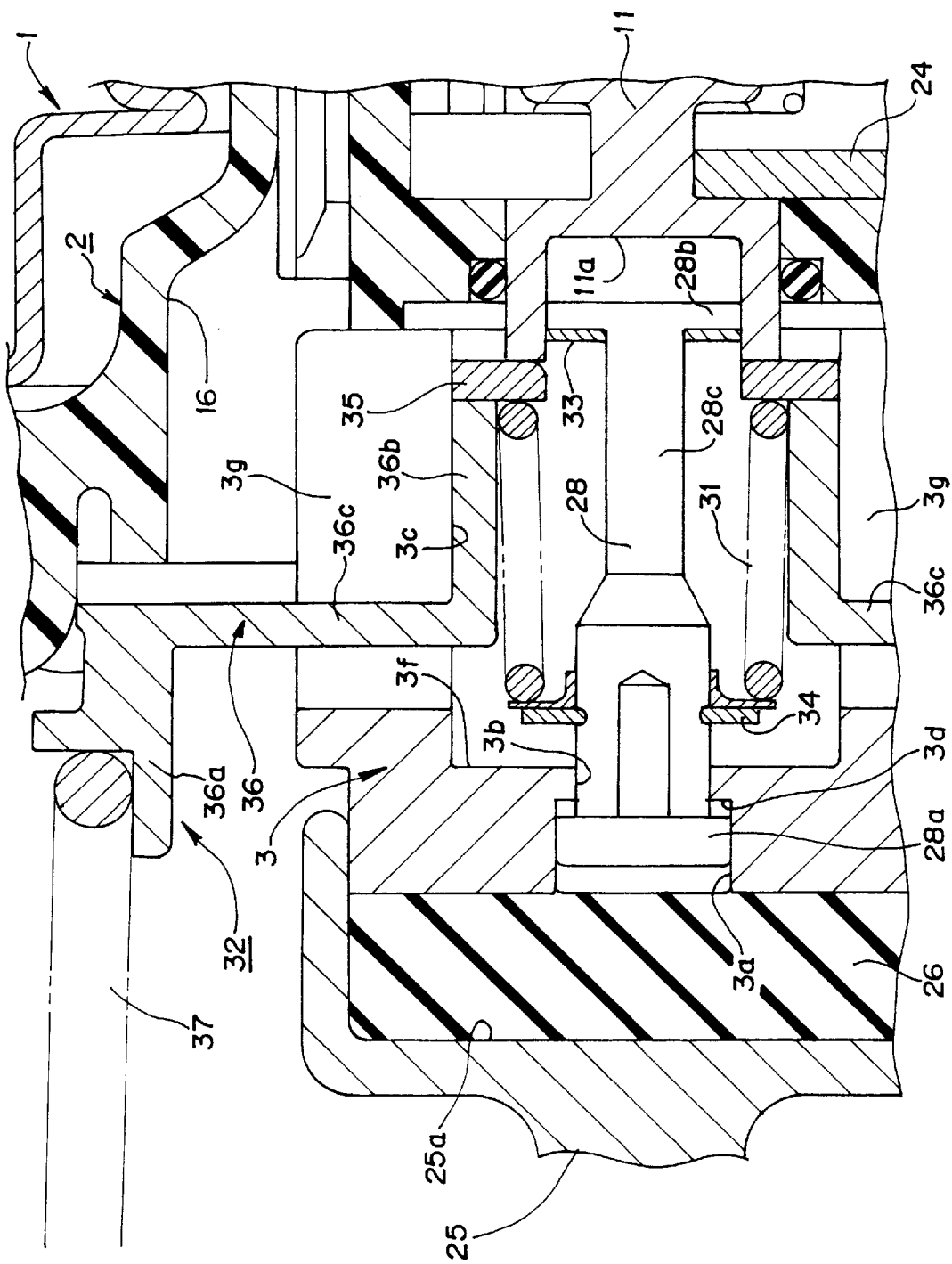
FIG. 2 is an enlarged view of a pertinent portion shown in FIG. 1.

Referring to the drawings, an embodiment of the invention shown in the drawings will now be described. Referring to FIGS. 1 and 2, the brake booster includes a shell 1 in which a substantially tubular valve body 2 is slidably disposed. A cylinder member 3, which forms part of the valve body 2, is integrally fitted into the inner periphery of the valve body 2 at the front end thereof.

A power piston 4 is connected around the outer periphery of the valve body 2, and a diaphragm 5 is applied to the back surface of the power piston 4, thus partitioning the interior of the shell 1 into a forwardly located constant pressure chamber A and a rearwardly located variable pressure chamber B.

The valve body 2 contains a valve mechanism 6 which switches a fluid circuit between the constant pressure chamber A, the variable pressure chamber B and the atmosphere. Specifically, the valve mechanism 6 comprises an annular vacuum valve seat 7 formed on the valve body 2, a valve plunger 11 slidably fitted into the valve body 2 and including a rear end which is coupled to an input shaft 8, an annular atmosphere valve seat 12 formed on the valve plunger 11, and a substantially tubular valve element 14 which is urged by the resilience of a spring 13 to be seated upon either valve seat 7 or 12.

A seat area defined by the vacuum valve seat 7 and the valve element 14 which engages or disengages therefrom constitutes a vacuum valve 15, and a space located radially outward of the vacuum valve 15 is maintained in communication with the constant pressure chamber A through a constant pressure passage 16 formed in the valve body 2. A negative pressure is normally introduced into the constant pressure chamber A through a tubing 17 which is provided in order to feed a negative pressure.

A seat area defined by the atmosphere valve seat 12 and the valve element 14 which engages with or disengages from it constitutes an atmosphere valve 18, and a space located intermediate the atmosphere valve 18 and the vacuum valve 15 is maintained in communication with the variable pressure chamber B through a variable pressure passage 21, formed as a radially extending opening through the valve body 2.

Finally, a space located radially inward of the atmosphere valve 18 is maintained in communication with the atmosphere through an atmosphere passage 22 which is formed by the internal space of the valve body 2. It will be noted that a filter 23 is disposed in the atmosphere passage 22.

The valve plunger 11 is engaged by a key member 24, which prevents the valve plunger 11 from being disengaged from within the valve body 2.

The cylinder member 3 has a front end which is located forwardly of the front end face of the valve body 2, and a recess 25a which is formed in one end of an output shaft 25 is slidably fitted around the outer periphery of the cylinder member 3 at its front end. A reaction disc 26 is received within the recess 25a of the output shaft 25, and is interposed between the front end face of the cylinder member 3 and the bottom of the recess 25a.

A return spring 27 is disposed between the valve body 2 and a front wall surface of the shell 1, and accordingly, in the inoperative condition, the valve body 2 remains at rest in the inoperative position shown in which the key member 24 abuts against the rear wall surface of the shell 1. Under this inoperative condition, the vacuum valve 15 is open while the atmosphere valve 18 is closed. Accordingly, a communication is established between the constant pressure chamber A and the variable pressure chamber B, into which a negative pressure is introduced.

In the present embodiment, a reaction transmitting member 28 and a spring 31 are disposed between the reaction disc 26 and the plunger 11, and in addition, pseudo-reaction imparting means 32 is provided in order to enable an increased output to be reliably obtained even by a powerless female driver.

Specifically, as shown to an enlarged scale in FIG. 2, the reaction transmitting member 28 has flanges 28a, 28b of an increased diameter at its front and rear ends. The flange 28b disposed at the rear end is slidably fitted into a bottomed opening 11a formed in the front end face of the valve plunger 11. It will be noted that a ring-shaped retainer 33 is fitted at a given location within the bottomed opening 11a which is disposed forwardly of the flange 28b, preventing the flange 28b from being disengaged from the bottomed opening 11a. This permits the reaction transmitting member 28 and the valve plunger 11 to be axially spaced apart by a maximum distance by which the flange 28b is spaced from the bottom of the opening 11a.

On the other hand, the inner periphery of the cylinder member 3 has a varying internal diameter in the axial direction. Specifically, it has a medium diameter 3a at a foremost location around the inner periphery of the cylinder member 3, and has a reduced diameter 3b at a location which is axially adjacent to and rearward of the foremost location, and has an increased diameter 3c in a portion located rearward of the reduced diameter portion 3b. The flange 28a disposed at the front end of the reaction transmitting member 28 is slidably fitted into the medium diameter portion 3a of the cylinder member 3, and an intermediate portion 28c of the reaction transmitting member 28 which is located intermediate the both flanges 28a, 28b extends through the reduced diameter portion 3b and the increased diameter portion 3c of the cylinder member 3. It will be noted that a ring-shaped retainer 34 is fixedly mounted at a given location on the intermediate portion 28c of the reaction transmitting member 28 which is disposed inside the increased diameter portion 3c. In addition, an annular member 35 is slidably fitted into the increased diameter portion 3c at a rearward location, and the annular member 35 is disposed in abutment against the front end face of the valve plunger 11. The spring 31 which is charged to a preset load is disposed across the retainer 34 and the annular member 35 which are disposed in opposing relationship with respect to each other.

The resilience of the spring 31 normally urges the reaction transmitting member 28 in the forward direction. Accordingly, in the inoperative condition of the brake booster shown, the flange 28b which is located at the rear end of the reaction transmitting member 28 abuts against the retainer 33 while the flange 28a which is located at the front end of the reaction transmitting member 28 is slightly spaced from a stepped end face 3d, which serves as a stop. The retainer 34 is spaced from its opposing stepped end face 3f. A clearance is also maintained between the reaction disc 26 and its opposing flange 28a which is located at the front end of the reaction transmitting member 28.

Pseudo-reaction imparting means 32 comprises a reaction piston 36 in the form of a stepped cylinder which is disposed in surrounding relationship with the reaction transmitting member 28, and a spring 37 which urges the reaction piston 36 rearward. The reaction piston 36 includes a forward portion 36a of an increased diameter and a rearward portion 36b of a reduced diameter, which are joined together by a rectilinear connector 36c which extends diametrically along the boundary therebetween. At an axially rear portion, the cylinder member 3 is formed with a pair of axially extending slits 3g which are diametrically aligned with each other. The connector 36c of the reaction piston 36 is engaged with the slits 3g in the cylinder member 3, and the rearward portion 36b of a reduced diameter is slidably fitted inside the increased diameter portion 3c of the cylinder member 3 at a location forwardly of the annular member 35. Under this condition, the increased diameter portion 36a of the reaction piston 36 surrounds the cylinder member 3, and is slidably fitted inside the inner periphery of the valve body 2 at its front end. A spring 37 acting as a resilient member is disposed between the forward portion 36a of an increased diameter of the reaction piston 36 and the front wall surface of the shell 1. The spring 37 normally urges the reaction piston 36 rearward, which has its rear end or the rear end of the rearward portion 36b of a reduced diameter held in abutment against the annular member 35. Thus, the valve plunger 11 is urged rearward by the resilience of the springs 37 and 31.

The operation of the above embodiment will now be described. Under the inoperative condition of the brake booster shown in FIG. 1 or 2, the vacuum valve 15 is open while the atmosphere valve 18 is closed. The medium diameter portion 28a of the reaction transmitting member 28 is spaced from the stepped end face 3d serving as a stop while the front end face of the reaction transmitting member 28 is spaced from the reaction disc 26.

When a brake pedal, not shown, is depressed under the inoperative condition to drive the input shaft 8 and its coupled valve plunger 11 and reaction transmitting member 28 forward, the vacuum valve 15 is closed while the atmosphere valve 18 is opened. This introduces the atmosphere into the variable pressure chamber 13, and accordingly, a pressure differential between the negative pressure in the constant pressure chamber A and the atmospheric pressure in the variable pressure chamber B drives the valve body 2 and the output shaft 25 forward. Thus, the brake booster is actuated.

When the brake booster is actuated in this manner, the reaction disc 26 is axially compressed by a reaction from the output acting on the output shaft 25, whereby the rear end face of the reaction disc bulges rearward to abut against the front end face of the reaction transmitting member 28 (or the end face of the flange 28a) over the entire area thereof. During this initial phase of operation of the brake booster, a force of depression (input) applied to the brake pedal is small, and the spring 31 is not compressed. Accordingly, the resilience of the spring 31 is effective to maintain the rear flange 28b of the reaction transmitting member 28 in abutment against the retainer 33. Consequently, the reaction transmitting member 28, the spring 31 and valve plunger 11 substantially function as an integral structure. Hence, subsequent to a point in time P in FIG. 3 (a jumping point) where the reaction disc 26 abuts against the flange 28a of the reaction transmitting member 28, an output increases with a given servo ratio which is determined by the cross-sectional area of the flange 28a of the reaction transmitting member 28 and the area of the front end face of the cylinder member 3 which is in abutment against the reaction disc 26.

As mentioned previously, in the present embodiment, pseudo-reaction imparting means 32 is provided. Accordingly, when the input shaft 8 and the valve plunger 11 are driven forward, a pseudo-reaction resulting from the spring 37 is transmitted to the valve plunger 11 through the reaction piston 36. In this manner, in the present embodiment, when a brake pedal is depressed to actuate the brake booster 1, a reaction from an actual output which is transmitted to the valve plunger 11 through the reaction disc 26 is combined with a pseudo-reaction imparted to the valve plunger 11 through the pseudo reaction imparting means 32 to provide a combined reaction, which is transmitted to a driver through the valve plunger 11 and the input shaft 8.

Figure 3:
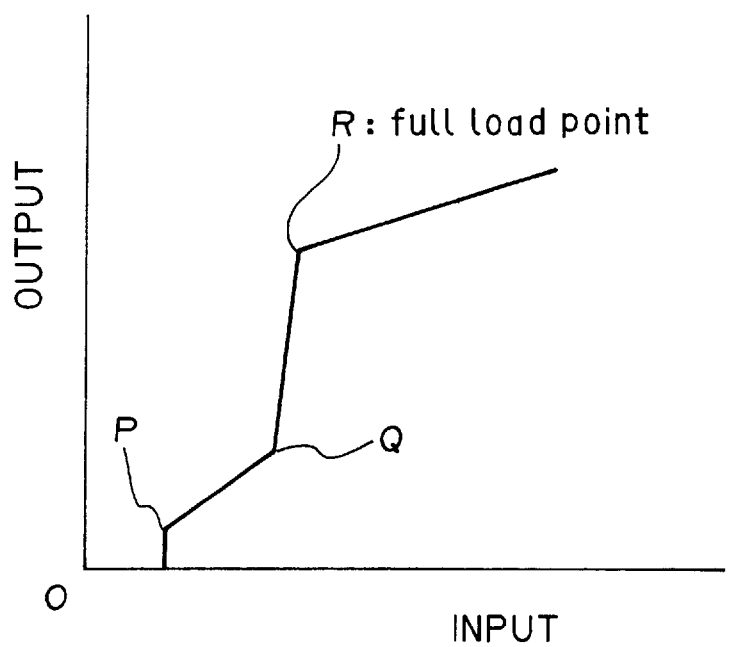
FIG. 3 graphically shows a relationship between an input and an output of the brake booster shown in FIG. 1.

When a force of depression (input) applied to a brake pedal exceeds a given value subsequent to the initiation of operation of the brake booster, the spring 31 is compressed, whereby the flange 28a of the reaction transmitting member 28 abuts against the stepped end face 3d serving as a stop. Subsequent to this point in time Q which is shown in FIG. 3, a reaction from the output acting on the output shaft 25 is entirely transmitted to the cylinder member 3 (or the valve body 2), and the reaction from the actual output is no longer transmitted to the input shaft 8. On the other hand, because the reaction piston 36 is in abutment against the annular member 35, it follows that subsequent to the point in time Q shown in FIG. 3, only the pseudo-reaction imparted by the pseudo-reaction imparting means 32 is transmitted to the valve plunger 11. In this manner, the reaction which is transmitted to the driver through the valve plunger 11 and the input shaft 8 is reduced, allowing the output to increase rapidly to a full load operating point R. Subsequent to the point R, the output increases at a ratio of 1:1 with respect to the input, as is known in the art.

To recapitulate, in the present embodiment, a combined reaction of a reaction from the actual output and a pseudo-reaction is transmitted to a driver in a region where a force of depression (input) applied to a brake pedal subsequent to the initiation of operation of the brake booster is small, and when the input exceeds a given value, only the pseudo-reaction is transmitted to a driver.

Accordingly, in the event of an emergency brake in which a braking force of an increased magnitude is required, for example, an increased output can be reliably obtained in response to a small input, even for a driver who may be a powerless woman or the like. In this manner, the operational response during a quick braking operation is improved while improving the safety of operating a brake.

It will be noted that with the present embodiment, the point in time at which the flange 28a of the reaction transmitting member 28 abuts against the stepped end face 3d serving as the stop (a point Q shown in FIG. 3) may be easily changed, by changing the preset load to which the spring 31 is charged. On the other hand, by changing the preset load which is charged to the spring 37, a change in the substantial servo ratio which prevails subsequent to the point in time as shown at Q in FIG. 3 is facilitated. This facilitates changing a brake feeling experienced by a driver.

In the above embodiment, the return spring 27 and the spring 37 which constitutes the pseudo-reaction imparting means are separately provided. However, the inherent return spring 27 may be omitted, allowing the spring 37 which constitutes the pseudo-reaction imparting means to serve as the return spring 27 also.

While the embodiment described above has been illustrated as an application of the invention to a brake booster of single type, it should be understood that the invention is also applicable to a brake booster of tandem type or triple type having a plurality of sets of constant and variable pressure chambers within the shell 1. In addition, the invention is also applicable to a clutch booster.

While the invention has been disclosed above in connection with a preferred embodiment thereof, it should be understood that a number of changes, modifications and substitutions therein are possible without departing from the spirit and the scope of the invention defined by the appended claims .

What is claimed is:

1. A booster including a valve body slidably disposed within a shell, a valve plunger slidably fitted into the valve body and coupled with an input shaft, an output shaft having one end which is slidably mounted on the valve body, a reaction disc disposed between said one end of the output shaft and the valve plunger, a reaction transmitting member having a front end which is disposed in opposing relationship with the reaction disc and a rear end which is slidably fitted to the valve plunger, and a spring charged to a preset load and disposed between the reaction transmitting member and the valve plunger for normally urging the reaction transmitting member toward the front side, an arrangement being such that a reaction from an output which acts on the output shaft is transmitted to the input shaft through the reaction disc, the reaction transmitting member, the spring and the valve plunger;

characterized by the provision of pseudo-reaction imparting means which imparts a pseudo-reaction to the input shaft, which pseudo-reaction depends on a travel of the input shaft, a stop being mounted on the valve body, the reaction transmitting member abutting against the stop to prevent a reaction of the output acting on the output shaft from being transmitted to the input shaft as the spring is compressed when an input applied to the input shaft exceeds a given value.

2. A booster according to claim 1 in which a front end of the reaction transmitting member is formed into a flange, the valve body being formed with a stepped end face, at a location rearward of the front end of the reaction transmitting member which is formed as the flange, in opposing relationship thereto and serving as the stop, the pseudo-reaction imparting means comprising a reaction piston disposed in surrounding relationship with the spring and slidably fitted into the valve body and including a rear portion which is coupled to the valve plunger, and a resilient member which urges the reaction piston toward the valve plunger.

3. A booster according to claim 1 in which the resilient member of the pseudo-reaction imparting means comprises a spring, which also serves as a return spring for returning the valve body or the like to its inoperative position.

\* \* \* \* \*